April 7, 1953 E. F. AYER ET AL 2,633,951
ROLLER TYPE OVERRUNNING CLUTCH
Filed Oct. 3, 1950 2 SHEETS—SHEET 1
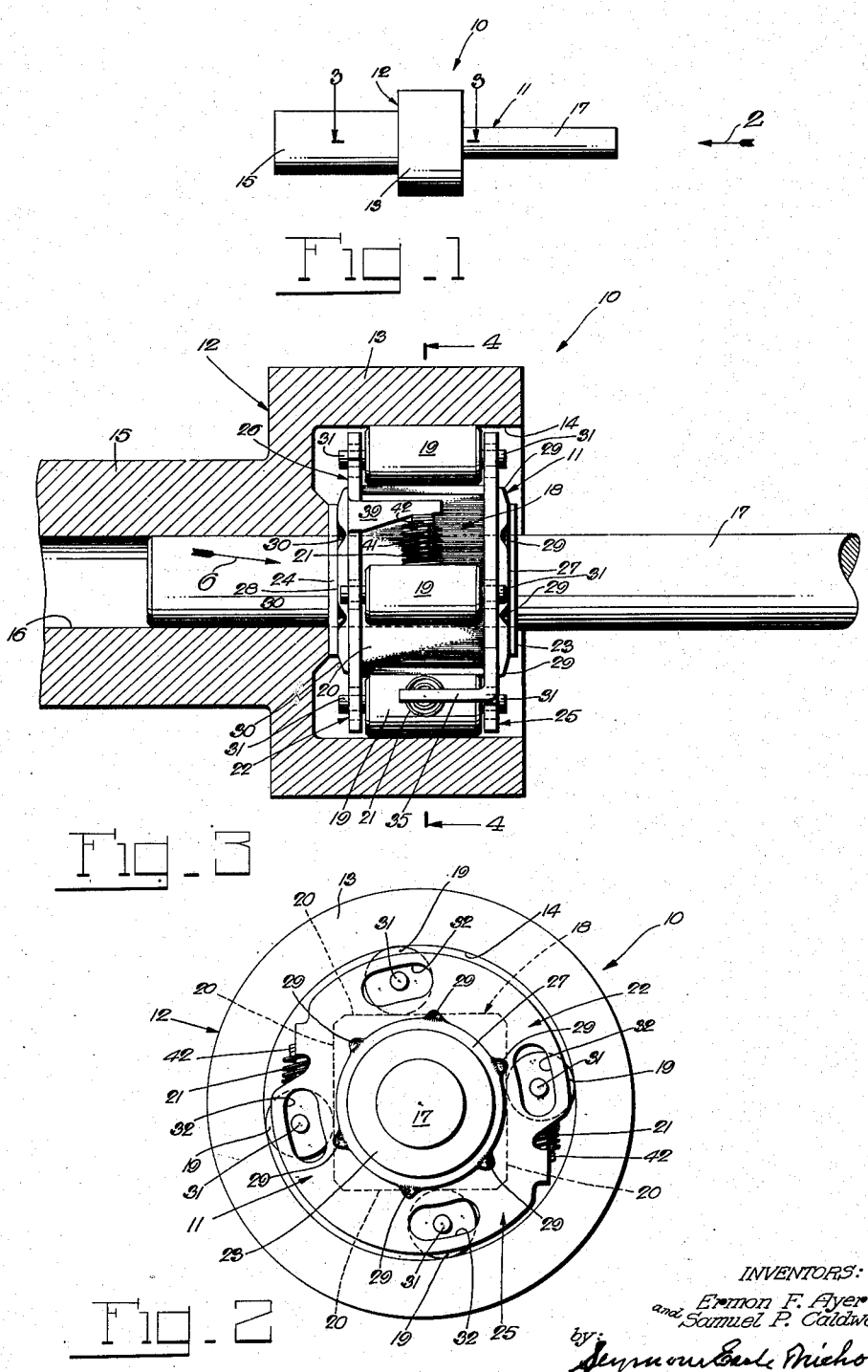
INVENTORS:
Ermon F. Ayer
and Samuel P. Caldwell
by:
Seymour Earle Nichols
Attorneys.

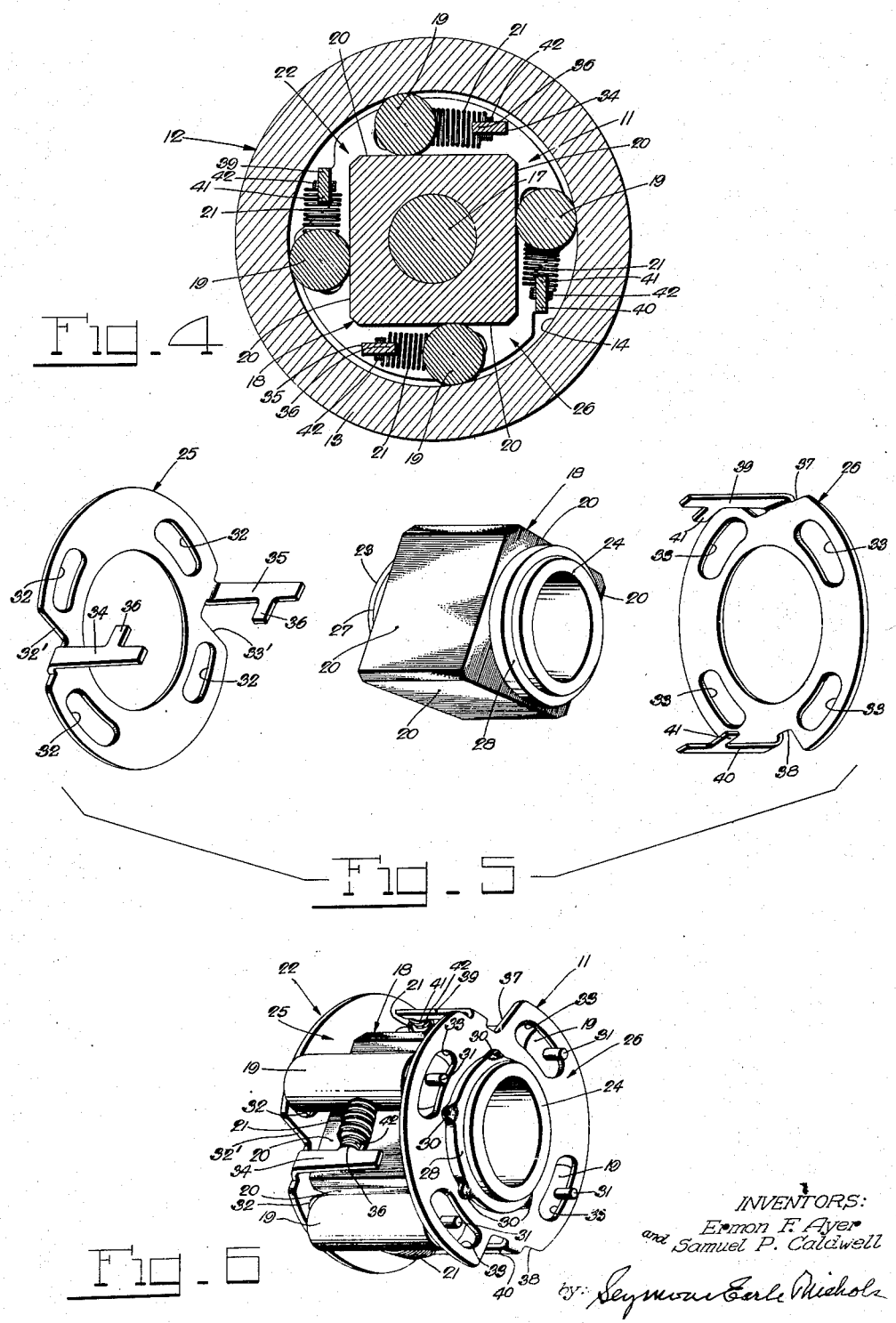

Patented Apr. 7, 1953

2,633,951

UNITED STATES PATENT OFFICE 2,633,951

ROLLER TYPE OVERRUNNING CLUTCH

Ermon F. Ayer, North Haven, and Samuel P. Caldwell, Hamden, Conn., assignors to High Precision, Incorporated, Hamden, Conn., a corporation of Connecticut Application October 3, 1950, Serial No. 188,134

2 Claims. (Cl. 192—45)

This invention relates to clutches, and more especially to clutches of the uni-directional or overrunning type.

It is one of the main objects of the present invention to provide a clutch of the overrunning type which is espacially, though not exclusively, adapted for power transmission in drives of relatively small dimensions.

Accordingly, it is another object of the present invention to provide a clutch of this type which may be relatively small in size and condensed in construction, yet may safely transmit a considerable torque.

A further object of the present invention is to provide a clutch of this type of which all parts are arranged in two units that constitute the driving and driven members, respectively, of the clutch, thereby to facilitate the mounting of these clutch-members in, and their dismounting from, any drive and especially drives of small dimensions.

It is another object of the present invention to provide a clutch of this type of which one of the clutch-members is a single element and the other clutch-member embodies all the remaining parts of the clutch in a self-contained unit, so that tampering with these parts in their assembled relation, or the replacement of any one or more defective parts, by an operator is discouraged, and defective performance of the clutch through wear of any one or more of the parts of this unit may quickly and easily be remedied even by an unskilled operator by simply replacing the entire unit with a factory-assembled and tested unit.

It is also among the objects of the present invention to make the parts of this self-contained clutch-unit from readily available standard stock materials by simple and preferably automatic machine operations, thereby to keep the cost of these parts at a minimum.

Still a further object of the present invention is to construct the aforementioned self-contained clutch-unit from a minimum number of different parts which may easily be assembled and locked in their correct assembled relation by simple deformation of one of these parts, so that the instant unit, while having all the attributes of precision in construction and function, nevertheless lends itself to highly efficient mass production at low cost.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a side elevation of an assembled overrunning-type clutch embodying the present invention;

Fig. 2 is an enlarged end elevation of the clutch as viewed in the direction of the arrow 2 in Fig. 1;

Fig. 3 is an enlarged, partial longitudinal section and partial elevation of the clutch, the section being taken on the line 3—3 of Fig. 1, and a certain driving-unit of the clutch being shown angularly displaced from the position shown in Fig. 2;

Fig. 4 is a cross-section through the clutch as taken on the line 4—4 of Fig. 3;

Fig. 5 perspectively illustrates companion parts of a certain unit of the clutch in disassembled relation; and Fig. 6 is a perspective view of a certain unit of the clutch as viewed generally in the direction of the arrow 6 in Fig. 3.

Referring to the drawings, and more especially to Figs. 1 to 3 thereof, the reference numeral 10 designates a clutch of the uni-directional type, and more particularly of the overrunning type, having the clutch-members 11 and 12, of which member 11 is usually the driver and member 12 is usually the driven member, although they may, if necessary, be used in the alternative.

The clutch-member 12 is, in the present instance, in the form of a cup 13, having an internal cylindrical clutch-surface 14 and a rearwardly-extending shank 15 which is centrally bored at 16. The clutch-member 12 may, by means of its shank 15, be mounted on, or coupled to, any shaft of a drive for which the instant clutch is intended.

The other clutch-member 11 comprises, in the present instance, a shaft 17, a hub 18 thereon, and a plurality of rollers 19 which, in the assembled relation of the clutch, are interposed between the hub 18 and the clutch-surface 14 of the clutch-member 12 (Figs. 3 and 4). The hub 18 is provided with as many cam-faces 20 as there are rollers 19. In the present instance, there are provided four of these rollers 19, wherefore the hub 18 is provided with four cam-faces 20, each of which is adapted to cooperate with a roller 19. Each roller 19 is urged into engagement with the clutch-surface 14 of the clutch-member 12 and with the adjacent cam-face 20 of the hub 18 by means of a helical compression-type spring 21. The shaft 17, on which the presently separate hub 18 may be mounted in any suitable manner, as by press-fitting, for instance, is journalled in the bore 16 of the clutch-member 12 (Fig. 3) for rotation of the hub 18 coaxially of the latter.

For advantageous reasons hereinafter described, the hub 18, rollers 19 and springs 21 are arranged in a self-contained driving-unit 22. To this end, the hub 18, which is preferably made of steel, is provided at its opposite ends with machined cylindrical bosses 23 and 24, respectively, on which are mounted end-rings or flanges 25 and 26, respectively. More particularly, the bosses 23 and 24 are, in the present instance, provided with offset annular shoulders 27 and 28, respectively, of which angularly-spaced portions are simply swaged or punched at 29 and 30, respectively, into firm overlapping engagement with the respective end-rings 25 and 26 for the secure mounting of the latter on the hub 18 (Figs. 3 and 6). The hub 18 and end-rings 25 and 26 together form a cage in which the rollers 19 and springs 21 are mounted in the following manner.

In assembling the end-rings 25 and 26 with the hub 18 as described above, the rollers 19 are interposed between these end-rings adjacent the cam-faces 20, respectively, of the hub, and opposite pintles 31 on each roller 19 are inserted into aligned slots 32 and 33 in the end-rings 25 and 26, respectively. The rollers 19 are thus securely anchored in the end-rings 25 and 26 against removal therefrom, yet are permitted by the preferably arcuate slots 32 and 33 in the end-rings 25 and 26, respectively, to float restrictedly in all directions transversely of their respective axes. The rollers 19 may also have more or less axial play between the end-rings 25 and 26 so long as it is insufficient to permit their removal from between the latter.

The end-ring 25 is, in the present instance, provided with diametrically-opposite peripheral notches 32' and 33' from which extend inwardly-formed integral lugs or arms 34 and 35, respectively, each of which has a laterally-extending spring-retaining finger 36 (see also Fig. 5). The opposite end-ring 26 has similar diametrically-opposite peripheral notches 37 and 38 from which extend inwardly-formed integral lugs 39 and 40, respectively, each of which has a laterally-extending spring-retaining finger 41 (Fig. 5). The end-rings 25 and 26 are angularly coordinated on the hub 18 so that their respective lugs 34, 35 and 39, 40 are disposed in equi-angularly spaced relationship (Figs. 4 and 6) and are equi-distant from the adjacent rollers 19 when the latter are in driving engagement with the clutch-member 12. For the secure anchorage of the compression springs 21 on the spring-retaining fingers 36 and 41, respectively, each spring 21 has a few end turns 42 wound closer than the remaining turns thereof. These closely-wound end turns 42 of each spring 21 are passed over a spring-retaining finger 36 or 41, as the case may be, and become seated thereon with sufficient snugness to hold the opposite end of the spring in engagement with the adjacent roller 19, even when the driving-unit 22 is removed from the clutch-member 12 (Fig. 6). The springs 21 thus mounted in the driving-unit 22 urge the adjacent rollers 19, in the assembled condition of the clutch, into engagement with the clutch-surface 14 of the driven clutch-member 12 and the adjacent cam-face 20 of the hub 18 (Fig. 4). Accordingly, in the instant example of an overrunning clutch, and assuming the clutch-member 11 to be the driver, clockwise rotation only of the latter as viewed in Fig. 4 will be transmitted to the driven clutch-member 12. To make a clutch of the instant type perform in the opposite direction, it is merely necessary to reverse the assembly end-for-end in the cup 13, as will be readily understood.

The hub 18 of the instant driving-unit 22 may conveniently and advantageously be made from square steel-bar stock, while the rollers 19 may be made from round steel-bar stock. In order to prevent rapid wear of the clutch parts 12, 18 and 19, they may be hardened. The slotted end-rings 25 and 26 may conveniently be stamped from sheet metal and their respective lugs 34, 35 and 39, 40 bent inwardly into the disposition shown in Fig. 5. Thus, the hub 18 and the rollers 19 may be made from readily available bar stock, while the end-rings 25 and 26 may be simple stampings.

It appears from Fig. 5 that the opposite end-rings 25 and 26 are identical in every respect, except that the respective lugs thereon extend in opposite directions. It also appears from Fig. 5 that each end-ring 25 and 26 is formed so as to be substantially dynamically balanced when mounted on the hub 18. Accordingly, since hub 18 is by virtue of its symmetrical form substantially dynamically balanced and the rollers 19 are identical, the entire unit 22 is in substantial dynamic balance. Further, the spring retaining or anchoring fingers on the lugs of the end-rings 25 and 26 extend in a common transverse plane through hub 18 substantially midway between the end rings 25 and 26 (Fig. 3), so that the springs 21 urge the respective rollers 19 most uniformly into engagement with the clutch surface 14 of the outer clutch member 12 and the adjacent cam face 20, respectively, of the hub 18.

It follows from the preceding description that the instant clutch is structurally extremely simple. Thus, only a minimum number of different parts 18, 19, 21, 25 and 26 are required for the driving-unit 22, and these parts are readily assembled without requiring any special skill on the part of the assembler. Hence, the instant clutch, by virtue of the structural simplicity of the few different parts of the driving-unit 22 and the ease with which these parts may be assembled, lends itself to efficient mass production at low cost, while nevertheless having all the attributes of precision in construction and operation and being, moreover, well balanced dynamically. The instant clutch lends itself to especially efficient and low-cost mass production since the hub 18 and the rollers 19 may be cut from available bar stock, and they require no further machining other than centrally boring the hub 18 for its mounting on the shaft 17 and, if desired, breaking the corners of the hub as illustrated, and turning the rollers 19 for the provision of the pintles 31 thereon. Further, the instant end-rings 25 and 26 permit the ready and convenient as well as secure anchorage of the rollers 19 and the springs 21. The assembly of the driving-unit 22 is further facilitated in that the parts thereof are securely locked in their correctly assembled relation by simple deformation of one of these parts, i. e., the swaging of the opposite shoulders 27 and 28 on the hub 18.

The instant clutch 10 is, by virtue of the provision of the self-contained driving-unit 22, particularly useful in drives of small or relatively small dimensions, in that the assembly of the clutch-members 11 and 12 into the clutch requires no further assembly of any other parts and is accomplished by simply sliding the driving-unit 22 axially into the clutch-member 12. While the instant clutch may, for drives of small or relatively small dimensions, be made of accordingly small size, the same will nevertheless safely transmit a very considerable torque if necessary. Further, the factory-assembly of the clutch parts 18, 19, 21, 25 and 26 into the single self-contained driving-unit 22 will discourage any operator from tampering with these parts or from repairing any one or more defective parts, since defective performance of the clutch by reason of wear of any one of these parts may assuredly be remedied much quicker, simpler and cheaper by simply replacing the entire unit with a new factory-assembled and tested unit.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. In a clutch of the overrunning type having a roller between the clutch surfaces of the inner and outer clutch members thereof, the combination of separate lateral apertured flanges permanently secured to the opposite ends, respectively, of one of said clutch members, one of said flanges having an integral arm projecting inwardly into the space between said clutch surfaces and being provided with an integral laterally projecting finger; an axially compressed spring seated with one end against said arm and bearing with its other end against said roller to urge the same into driving engagement with said clutch surfaces, said finger being of cross-sectionally smaller area than the axial opening through the majority of successive turns, including an end turn, of said spring, and the remaining turns of said spring being wound closer than the turns of said majority and embrace said finger with sufficient snugness axially to project said spring against the periphery of said roller, and said finger being of a length to extend into said spring to such an extent only that the greater part of the length of said spring in its compressed condition extends beyond said finger; and opposite end pintles on said roller, said flanges being adapted axially to confine said roller therebetween and said apertures therein being aligned and receiving the opposite end pintles, respectively, of said roller with freedom to move restrictedly, so that said flanges, roller and spring form together with said one clutch member a single contained unit.

2. In a clutch of the overrunning type having a roller between the clutch surfaces of the inner and outer clutch members thereof, the combination of separate lateral apertured flanges permanently secured to the opposite ends, respectively, of one of said clutch members, one of said flanges having an integral arm projecting inwardly into the space between said clutch surfaces and being provided with an integral laterally projecting finger; an axially compressed spring seated with one end against said arm and bearing with its other end against said roller to urge the same into driving engagement with said clutch surfaces, said finger being of cross-sectionally smaller area than the axial opening through a plurality of successive turns, including an end turn, of said spring, and the remaining turns of said spring being wound closer than the turns of said plurality and embrace said finger with sufficient snugness axially to project said spring against the periphery of said roller; and opposite end pintles on said roller, said flanges being adapted axially to confine said roller therebetween and said apertures therein being aligned and receiving the opposite end pintles, respectively, of said roller with freedom to move restrictedly, so that said flanges, roller and spring form together with said one clutch member a single contained unit, and said finger being of a length to extend into said spring to such an extent only that the latter may, without permanent distortion, be readily placed over said finger and projected against said roller after said one clutch member, flanges and roller are assembled.

ERMON F. AYER.
SAMUEL P. CALDWELL.

REFERENCES CITED

The following references are of record in the file of this patent:

UNITED STATES PATENTS

| Number | Name | Date |
|---|---|---|
| 1,296,345 | Walk | Mar. 4, 1919 |
| 1,397,819 | Munters | Nov. 22, 1921 |
| 1,820,151 | Mullen | Aug. 25, 1931 |
| 1,851,973 | Brandt | Apr. 5, 1932 |
| 2,204,768 | Peck | June 18, 1940 |
| 2,371,653 | Schuckers | Mar. 20, 1945 |
| 2,494,006 | Schoij | Jan. 10, 1950 |